(12) United States Patent
Aoki

(10) Patent No.: US 6,168,167 B1
(45) Date of Patent: Jan. 2, 2001

(54) METAL LAMINATE GASKET WITH COMMON PLATE SUPPORT AREA

(75) Inventor: Katsuji Aoki, Yokohama (JP)

(73) Assignee: Ishikawa Gasket Co., Ltd., Tokyo (JP)

( * ) Notice: Under 35 U.S.C. 154(b), the term of this patent shall be extended for 0 days.

(21) Appl. No.: 09/109,173

(22) Filed: Jul. 2, 1998

(30) Foreign Application Priority Data

Aug. 28, 1997 (JP) .................................................. 9-232838

(51) Int. Cl.[7] .................................................. F16J 15/08
(52) U.S. Cl. ........................... 277/595; 277/594; 277/593
(58) Field of Search .................... 277/593, 594, 277/595, 234

(56) References Cited

U.S. PATENT DOCUMENTS

| | | | |
|---|---|---|---|
| 4,836,562 | * 6/1989 | Yoshino | 277/595 |
| 4,869,516 | * 9/1989 | Udagawa et al. | 277/595 |
| 5,087,058 | * 2/1992 | Miura et al. | 277/595 |
| 5,961,126 | * 10/1999 | Miyaoh | 277/594 |

* cited by examiner

Primary Examiner—Anthony Knight
Assistant Examiner—Enoch Peavey
(74) Attorney, Agent, or Firm—Kanesaka & Takeuchi

(57) ABSTRACT

A metal laminate gasket of the invention is used for an internal combustion engine. The gasket is basically formed of a first and second metal plates laminated together. Each of the first and second metal plates includes a hole corresponding to a hole of the engine, an inner plain portion around the hole, an inclined portion around the inner plain portion, and an outer plain portion around the inclined portion The inclined portions of the first and second plates are oriented in the same direction. The inner plain portion of the second plate has a length to contact a part of the outer plain portion of the first plate to form a support area. Thus, it is possible to securely seal around the hole of the engine by the inclined portions of the first and second plates.

7 Claims, 3 Drawing Sheets

METAL LAMINATE GASKET WITH COMMON PLATE SUPPORT AREA

BACKGROUND OF THE INVENTION AND RELATED ART STATEMENT

The present invention relates to a metal laminate gasket with a common plate support area used for an internal combustion engine. The gasket is especially useful as a manifold gasket disposed between a cylinder head and a manifold.

In an internal combustion engine, when the engine is actuated, the engine generates high power. Namely, when the engine is actuated, a high temperature and pressure exhaust gas is generated at combustion chambers of a cylinder head and is exhausted through the manifold. Since the high temperature and pressure exhaust gas passes through the manifold, when the engine is operated, the manifold deforms extremely. Especially, the manifold is deformed in a specific way such that the outer sides of the manifold branches open outwardly. Therefore, large forces different from each other are applied to a manifold gasket disposed between the cylinder head and the manifold.

Since a metal or metal laminate gasket is strong against high temperature and pressure, the metal or metal laminate gasket has been used widely as a manifold gasket as well as a cylinder head gasket.

A typical manifold gasket G is shown in FIG. 1, which is used for an engine with four combustion chambers. The manifold gasket G includes four exhaust holes 10 and bolt holes 11 to fix the manifold to the cylinder head through the manifold gasket. Beads 12 are formed around the respective exhaust holes 10 to securely seal therearound.

In one manifold gasket G1 as shown in FIG. 2, the gasket G1 is formed of two outer plates 13 and two inner plates 14 with beads 14a situated between the outer plates 13. The outer plates 13 are formed of a relatively soft metal plate, while the inner plates 14 are formed of a relatively hard and strong metal plate with a spring ability. The exhaust holes are sealed by the beads 14a.

In case the manifold does not deform largely, the gasket G1 as shown in FIG. 2 operates properly. However, if the deformation of the manifold in the lateral directions is relatively large, the beads can not follow or absorb the deformation of the manifold. Accordingly, the gasket G1 as shown in FIG. 2 can not properly seal around the exhaust holes.

In view of above problems, a gasket G2 as shown in FIG. 3 was made, which is disclosed in Japanese Patent Publication No. 4-88266. The gasket G2 includes two plate sections 15 on both sides of a center plate 16. Each plate section 15 is formed of metal plates 17, 18 with inclined portions or half beads 17a, 18a oriented in the opposite directions. The inclined portion 17a is defined by bent portions 17b, 17c, while the inclined portion 18a is defined by bent portions 18b, 18c. The gasket G2 has sufficient compressibility at the half beads to absorb the deformation of the manifold.

In the gasket G2, since the inclined portions 17a, 18a orient in the opposite directions, as long as the bent portions 17c, 18c align or abut against each other, the sufficient compressibility is formed by the inclined portions 17a, 18a. However, in case the bent portions 17c, 18c do not align together when the gasket G2 is compressed due to deformation by heat, assembly tolerance, manufacturing error and so on, portions of the plates 17, 18 other than the bent portions 17c, 18c are bent irregularly. As a result, the sufficient compression ability, especially recovery ability, can not be obtained by the bent portions 17c, 18c. Accordingly, the gasket can not securely seal around the exhaust holes.

In order to solve the above problems, the plates 17, 18 may be fixed together precisely, additional plate may be situated between the plates 17, 18, or additional plate section 15 may be further added to the gasket G2 to increase compression ability of the gasket. However, such remedies increase the manufacturing cost, the thickness or weight of the gasket.

On the other hand, a metal laminate gasket as disclosed in U.S. Pat. No. 5,378,001 has two plates with half beads bent in the same direction. This gasket operates as intended, but does not have a large compressible thickness to absorb a large deformation of an engine part.

The present invention has been made to solve the above problems, and an object of the invention is to provide a metal laminate gasket, which can provide a large compressible thickness or large spring recovering ability in the thickness direction of the gasket.

Another object of the invention is to provide a metal laminate gasket as stated above, which can securely seal around a hole even if the plates for the gasket are deformed largely by a high temperature.

A further object of the invention is to provide a metal laminate gasket as stated above, which has durability and does not creep easily.

Further objects and advantages of the invention will be apparent from the following description of the invention.

SUMMARY OF THE INVENTION

A metal laminate gasket of the invention is used for an internal combustion engine having a hole to be sealed. The gasket may be used as a cylinder head gasket, but it is especially useful as a manifold gasket. The gasket is basically formed of a first metal plate and a second metal plate laminated with the first metal plate.

The first metal plate includes a first hole corresponding to a hole of the engine, a first inner plain portion around the first hole, a first inclined portion around the first inner plain portion, and a first outer plain portion around the first inclined portion. The second metal plate includes a second hole corresponding to the hole of the engine, a second inner plain portion around the second hole, a second inclined portion around the second inner plain portion, and a second outer plain portion around the second inclined portion. The first and second inclined portions orient in the same direction and form half beads.

The second inner plain portion has a length such that a part of the first outer plain portion is placed over a part of the second inner plain portion to form a support area therebetween. Thus, the first and second inclined portions or half beads can obtain the sufficient compressible thickness to securely seal around the hole of the engine.

The second inner plain portion has a sufficient length to form the support area with the first outer plain portion when the first and second plates are laminated and are used as the gasket. Namely, the first and second inclined portions do not overlap together when the gasket is assembled and used. Accordingly, even if the first and second metal plates are laterally displaced or moved by heat expansion, vibration of the engine and so on, the support area is surely established to provide a large compressible thickness or ability by the first and second inclined portions. Thus, the gasket can securely seal a large gap between two engine parts.

In the invention, therefore, when the gasket is assembled, it is not required to precisely align the first and second plates. It is possible to provide a metal laminate gasket which can provide a large compression ability with a low cost.

The width of the support area or a portion where the second inner plain portion and the first outer plain portion contact together is between 0.5 and 2.00 mm, preferably between 0.6 and 1.2 mm, when the gasket is assembled.

Preferably, the gasket further includes a base member placed on one of the first and second metal plates. The base member may include a base metal plate with a flange portion around the hole of the engine disposed on the base metal plate to provide a high surface pressure around the hole of the engine. The base member may further include a second base metal plate laminated over the base metal plate. The second base metal plate may have a bead to surround the hole of the engine.

Also, the gasket may further include third and forth metal plates corresponding to the first and second metal plates, respectively. In this case, the first and third metal plates form outer plates and second and fourth plates form inner plates such that the first to fourth plates are piled and arranged symmetrically relative to a central plane of the gasket.

DETAILED DESCRIPTION OF PREFERRED EMBODIMENTS

With reference to the drawings, embodiments of the invention will be described.

Figure 1:
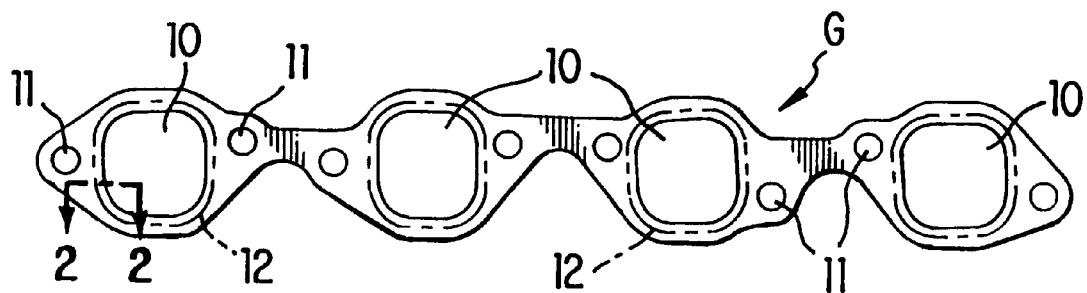
FIG. 1 is a plan view of a conventional manifold gasket.
Figure 2:
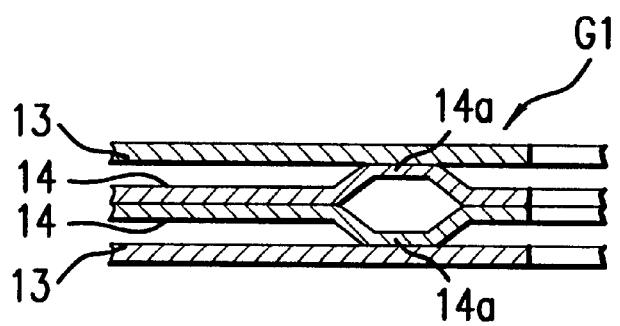
FIG. 2 is an enlarged sectional view taken along line 2—2 in FIG. 1.
Figure 3:
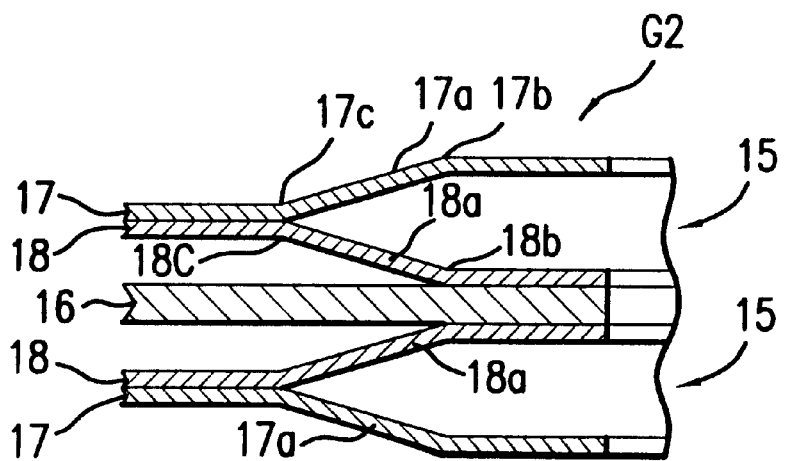
FIG. 3 is a sectional view, similar to FIG. 2, of another conventional gasket.
Figure 4:
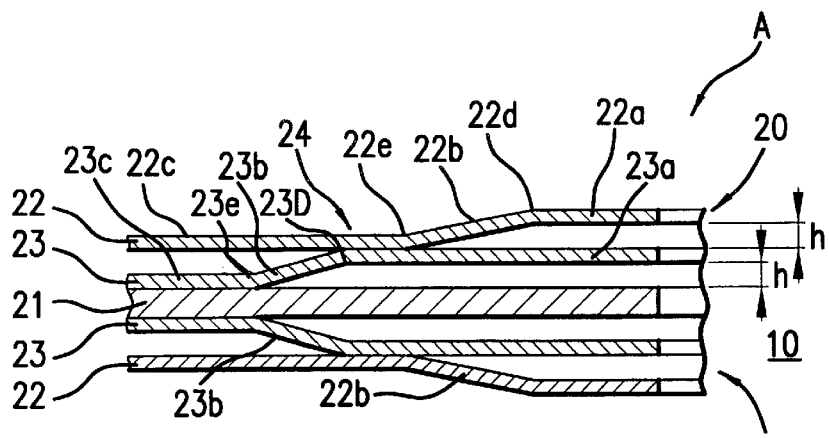
FIG. 4 is a sectional view, similar to FIG. 2, of a first embodiment of a metal laminate gasket of the invention.
Figure 5:
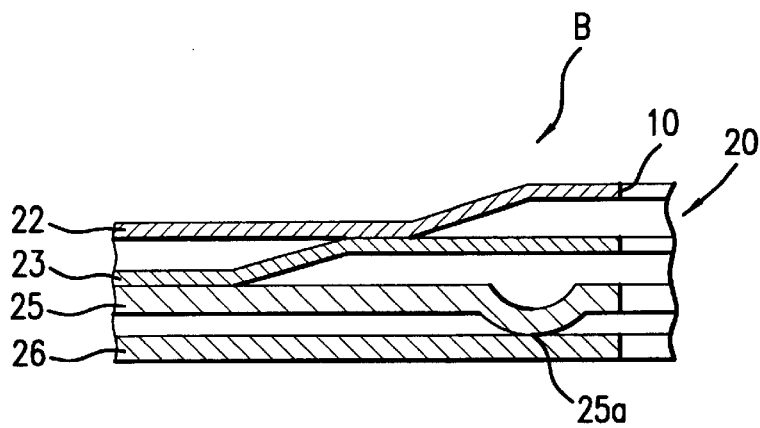
FIGS. 5–9 are sectional views, similar to FIG. 2, of second to sixth embodiments of the metal laminate gasket of the invention.
Figure 6:
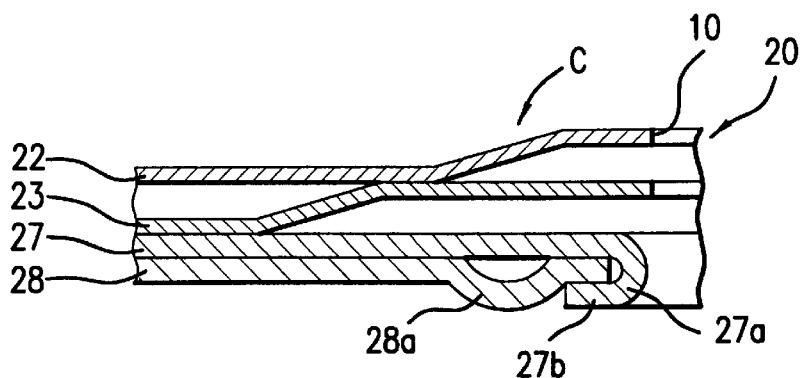
Figure 7:
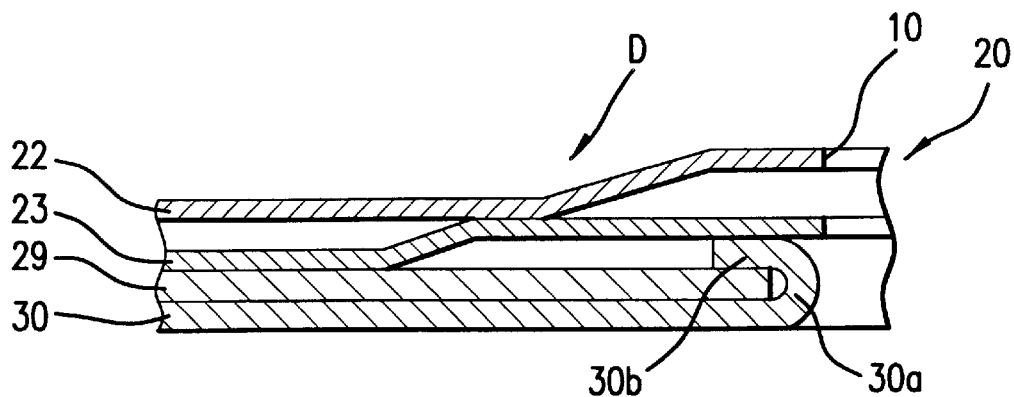
Figure 8:
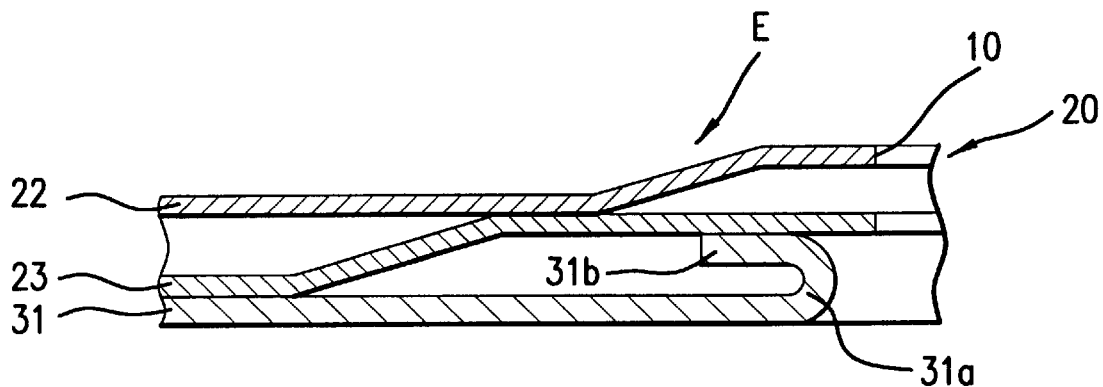
Figure 9:
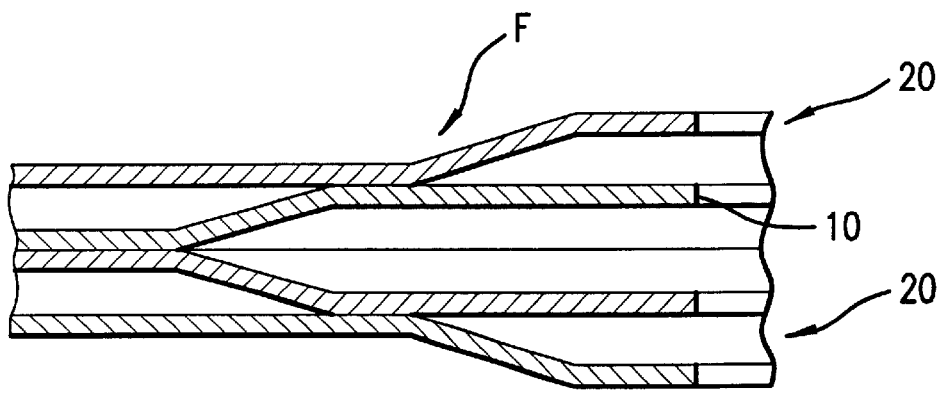

FIG. 4 is a first embodiment A of a metal laminate gasket of the invention. The gasket A is a manifold gasket, similar to the gasket G shown in FIG. 1, and includes exhaust holes 10 and bolt holes 11.

The gasket A is formed of two plate sections 20 and a base plate 21 situated between the two plate sections 20. The plate section 20 is formed of two metal plates 22, 23, which are made of stainless steel plates and quenched slowly to be relatively soft. The base plate 21 is made of a hard and strong plate, such as a stainless spring plate.

In the plate section 20, the plate 22 includes an inner plain portion 22a around the hole 10, an inclined portion 22b around the inner plain portion 22a, and an outer plain portion 22c around the inclined portion 22b. The inclined portion 22b is defined by bent portions 22d, 22e. Also, the plate 23 includes an inner plain portion 23a around the hole 10, an inclined portion 23b around the inner plain portion 23a, and an outer plain portion 23c around the inclined portion 23b. The inclined portion 23b is defined by bent portions 23d, 23e. The inclined portions 22b, 23b form half beads as well.

The inner plain portion 23a has a length such that the inner plain portion 23a partly contacts the outer plain portion 22c. The overlapping area between the inner plain portion 23a and the outer plain portion 22c forms a support area or portion 24. The support portion 24 is surely established when the gasket A is situated between a cylinder head and a manifold (both not shown) and the engine is actuated severely. Namely, even if the plates 22, 23 are subjected to high temperature and pressure from the engine, and are vibrated severely to move laterally, the support portion 24 is surely established. Even if the gasket is compressed or slightly moved, the inclined portions 22b, 23b do not overlap each other.

Thus, the half beads or inclined portions 22b, 23b are established to provide a sufficient compressibility.

For example, the base plate 21 may have the thickness of 0.2–0.8mm, and the plates 22, 23 may have the thickness of 0.2–0.4 mm.

The height h of the inclined portions or half beads 22b, 23b is 0.1–0.5 mm, and the width of the support portion 24 is 0.5–2.0 mm, preferably 0.6–1.2 mm when the plates are assembled. The thicknesses of the plates 21, 22, 23, the height of the inclined portions 22b, 23b and the width of the support portion 24 are selected as desired based on the temperature and pressure of the exhaust gas, the distance between exhaust ports of the cylinder head, and so on.

When the gasket A is installed between the cylinder head and the manifold, the inclined portions 22b, 23b are compressed to securely seal around the exhaust hole 10. In the gasket A, since the two plate sections 20 are formed on both sides of the base plate 21, the gasket A has sufficient compressibility. Therefore, even if a gap between the cylinder head and the manifold changes due to vibration or heat of the engine, the gasket A can securely seal the gap. Also, even if the manifold deforms due to heat, the deformation of the manifold can be well absorbed by the gasket A.

FIGS. 5–9 show second to sixth embodiments B–F of the gaskets of the invention, which is a combination of the plate section and one or two base plates. Namely, the gasket B is a combination of the plate section 20 and plates 25, 26. The plate 25 includes a bead 25a around the hole 10 to seal therearound. The gasket C is a combination of the plate section 20 and plates 27, 28. The plate 27 includes a curved portion 27a and a flange 27b, and the plate 28 includes a bead 28a. The gasket D is a combination of the plate section 20 and plates 29, 30. The plate 30 includes a curved portion 30a and a flange 30b. The gasket E is a combination of the plate section 20 and a base plate 31 with a curved portion 31a and a flange 31b. The gasket F is a combination of the two plate sections 20, which is the same as the gasket A without the base plate 21. The gaskets B–F operate as in the gasket A and securely seal around the exhaust hole.

In the gasket of the invention, the plate section 20 is formed of two metal plates with inclined portions or half beads. However, the plate section 20 may be formed of three or more plates with half beads. In the plate section 20, the inclined portions or half beads should be oriented in the same direction, but may be oriented in the different direction for a different plate section.

In the gasket of the invention, the plate section is formed of the metal plates with the inclined portions orienting in the same direction, and the metal plates are laminated to have the support area. Therefore, the metal plates need not be precisely aligned when the gasket is assembled. Also, it is not required to add a plain plate between the two metal plates with the inclined portions, so that in the metal gasket, the number of the plates can be reduced to lower the manufacturing cost.

Also, in the invention, even if the bending portions of the inclined portion are slightly changed relative to the exhaust hole, the effect of the inclined portion is not spoiled or changed. Thus, it is possible to maintain the effective thicknesses of the inclined portions to thereby securely seal around the exhaust hole.

Further, the thickness of the gasket is established by the lamination of the inclined portions or half beads with a small height. Thus, the creep relaxation of the beads including the initial creep relaxation of the respective inclined portions or half beads can be reduced. Thus, the durability of the gasket is improved.

When the engine is actuated, the manifold branches deform to orient or open outwardly to form gaps between the cylinder head and the manifold branches. However, in the gasket of the invention, since the gasket is formed thick with the sufficient spring recovery force, the gaps are securely sealed to prevent leakage of the high temperature and pressure exhaust gas.

While the invention has been explained with reference to the specific embodiments of the invention, the explanation is illustrative and the invention is limited only by the appended claims.

What is claimed is:

1. A metal laminate gasket for an internal combustion engine having a hole to be sealed, comprising:

a first metal plate including a first hole corresponding to a hole of the engine, a first inner plain portion situated immediately around the first hole, a first inclined portion extending from and situated around the first inner plain portion, and a first outer plain portion extending from and situated around the first inclined portion, and a second metal plate piled with the first metal plate and including a second hole corresponding to the hole of the engine, a second inner plain portion situated immediately around the second hole, a second inclined portion extending from and situated around the second inner plain portion and orienting in a same direction as that of the first inclined portion, and a second outer plain portion extending from and situated around the second inclined portion, said second inner plain portion having a length such that a part of the first outer plain portion is placed over and directly contacts a part of the second inner plain portion to form a support area to securely seal around the hole of the engine by the first and second inclined portions.

2. A metal laminate gasket according to claim 1, wherein said first outer plain portion and the second inner plain portion have sufficient lengths to provide the support area when the first and second plates are laminated and the gasket is used.

3. A metal laminate gasket according to claim 1, further comprising a base member placed on one of the first and second metal plates.

4. A metal laminate gasket according to claim 3, wherein said base member includes a base metal plate with a flange portion around the hole of the engine disposed on the base metal plate to provide a high surface pressure around the hole of the engine.

5. A metal laminate gasket according to claim 4, wherein said base member further includes a second base metal plate laminated over said base metal plate, said second base metal plate having a bead to surround the hole of the engine.

6. A metal laminate gasket according to claim 1, further comprising third and forth metal plates corresponding to the first and second metal plates, respectively, said first and third metal plates forming outer plates and second and fourth plates forming inner plates such that the first to fourth plates are piled and arranged symmetrically relative to a central plane of the gasket.

7. A metal laminate gasket according to claim 1, wherein said first inner plain portion, first inclined portion and a part of the first outer plain portion are situated above the second inner plain portion.

* * * * *